(12) United States Patent
McCall et al.

(10) Patent No.: US 7,813,856 B2
(45) Date of Patent: Oct. 12, 2010

(54) VEHICULAR SEATBELT MONITORING SYSTEM AND PROCESS

(75) Inventors: Clark E. McCall, Ann Arbor, MI (US); Lawrence M. Hallman, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 203 days.

(21) Appl. No.: 11/866,473

(22) Filed: Oct. 3, 2007

(65) Prior Publication Data

US 2009/0093932 A1 Apr. 9, 2009

(51) Int. Cl.
*G05D 1/00* (2006.01)
(52) U.S. Cl. .......................................................... 701/45
(58) Field of Classification Search ................... 701/36, 701/45; 180/271; 380/425.5, 426.16, 438
See application file for complete search history.

(56) References Cited

U.S. PATENT DOCUMENTS

| 7,002,457 | B2 |   | 2/2006 | Stevenson et al. |            |
|-----------|----|---|--------|------------------|------------|
| 7,132,934 | B2 | * | 11/2006| Allison, III     | 340/438    |
| 2006/0220815 | A1 | * | 10/2006 | Thomas        | 340/447    |
| 2007/0205884 | A1 | * | 9/2007  | Federspiel et al. | 340/457.1 |

\* cited by examiner

*Primary Examiner*—Kim T Nguyen
(74) *Attorney, Agent, or Firm*—Ingrassia Fisher & Lorenz, P.C.

(57) ABSTRACT

A seatbelt monitoring system is provided for use onboard a vehicle having a seat assembly including at least one seat and corresponding seatbelt. The seatbelt monitoring system includes a wireless seatbelt status detector and a vehicle seatbelt status indicator. The wireless seatbelt status detector includes a seatbelt latch sensor, a first wireless transceiver, and a controller coupled to the seatbelt latch sensor and to the wireless sensor. The controller is configured to send a seatbelt latch signal via the first wireless transceiver when the seatbelt latch sensor indicates a change in seatbelt latch status. The vehicle seatbelt status indicator includes a second wireless transceiver and a processor coupled to the second wireless transceiver. The processor is configured to send a receipt signal to the wireless seatbelt status detector after receiving the seatbelt status signal via the second wireless transceiver.

14 Claims, 5 Drawing Sheets

FIG. 6

VEHICULAR SEATBELT MONITORING SYSTEM AND PROCESS

TECHNICAL FIELD

The present invention generally relates to vehicular seatbelt systems and, more particular, to a vehicular seatbelt monitoring system and process.

BACKGROUND

Seatbelt monitoring systems are known that determine whether a passenger's seatbelt is latched after the occurrence of an event indicative of vehicle occupancy (e.g., ignition). If it is determined that the seatbelt latch has not been fastened, the seatbelt monitoring system may generate an indicator alert, such as a warning light mounted on the instrument panel, to indicate to the driver of the vehicle that a passenger may not be properly buckled in.

With the introduction of reconfigurable seat assemblies (e.g., removable second and third row bench seats), a need has developed for a seatbelt monitoring system that is capable of being contained within the seat assembly (e.g., being integrated into the seatbelt's buckle) and that wirelessly communicates with a controller connected to the vehicle's electrical infrastructure. To satisfy this need, a wireless seatbelt monitoring system has been introduced that includes a wireless transmitter, a piezoelectric element, and a micro-switch, which is open until the seatbelt's tongue is inserted into the seatbelt buckle. When inserted into or withdrawn from the seatbelt buckle, the seatbelt's tongue contacts and imparts mechanically stress to piezoelectric element. In response to this mechanical stress, the piezoelectric element generates a voltage, which is applied to the wireless transmitter. The transmitter utilizes this voltage, along with input from the micro-switch, to transmit a wireless signal (e.g., a radiofrequency signal) indicating the current latch status of the seatbelt (i.e., whether the seatbelt latch is fastened or unfastened). A processor associated with the vehicle (e.g., associated with the body control module) receives this wireless signal and, upon determining that the seatbelt is currently unlatched, generates an unlatched seatbelt alert (e.g., illuminates a warning light).

Although well suited for vehicles equipped with reconfigurable seat assemblies, wireless seatbelt monitoring systems of the type described above are limited in certain respects. For example, such seatbelt monitoring systems may generate an unlatched seatbelt alert at undesirable times (e.g., when the seat associated with an unlatched seatbelt is unoccupied). In addition, the wireless signal emitted by such seatbelt monitoring systems may not be received by a vehicle controller due to interference caused by, for example, a nearby antenna tower. As a result, the wireless seatbelt monitoring system may fail to properly indicate a change in seatbelt latch status.

It should thus be appreciated that it would be desirable to provide a wireless seatbelt monitoring system that generates unlatched seatbelt alerts for occupied seats only. It would also be desirable that such a wireless seatbelt monitoring system be configured to perform remedial steps if a wireless signal fails to reach the vehicle controller (e.g., resend the wireless signal and, if appropriate, generate an error alert). Other desirable features and characteristics of the present invention will become apparent from the subsequent detailed description and the appended claims, taken in conjunction with the accompanying drawings and the foregoing technical field and background.

SUMMARY

A seatbelt monitoring system is provided for use onboard a vehicle having a seat assembly including at least one seat and corresponding seatbelt. The seatbelt monitoring system includes a wireless seatbelt status detector and a vehicle seatbelt status indicator. The wireless seatbelt status detector includes a seatbelt latch sensor, a first wireless transceiver, and a controller coupled to the seatbelt latch sensor and to the first wireless transceiver. The controller is configured to send a seatbelt latch signal via the first wireless transceiver when the seatbelt latch sensor indicates a change in seatbelt latch status. The vehicle seatbelt status indicator includes a second wireless transceiver and a processor coupled to the second wireless transceiver. The processor is configured to send a receipt signal to the wireless seatbelt status detector after receiving the seatbelt status signal via the second wireless transceiver.

A method is also provided for wirelessly monitoring the status of a seatbelt associated with a seat in a vehicle. The method includes the steps of sending at least one wireless signal indicative of seatbelt latch status and of seat occupancy, receiving the wireless signal, generating an alert if the wireless signal indicates that the seatbelt latch is unfastened and that the seat is occupied, and sending a receipt signal indicating that the wireless signal has been received.

DESCRIPTION OF THE DRAWINGS

The present invention will hereinafter be described in conjunction with the following drawing figures, wherein like numerals denote like elements, and.

DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
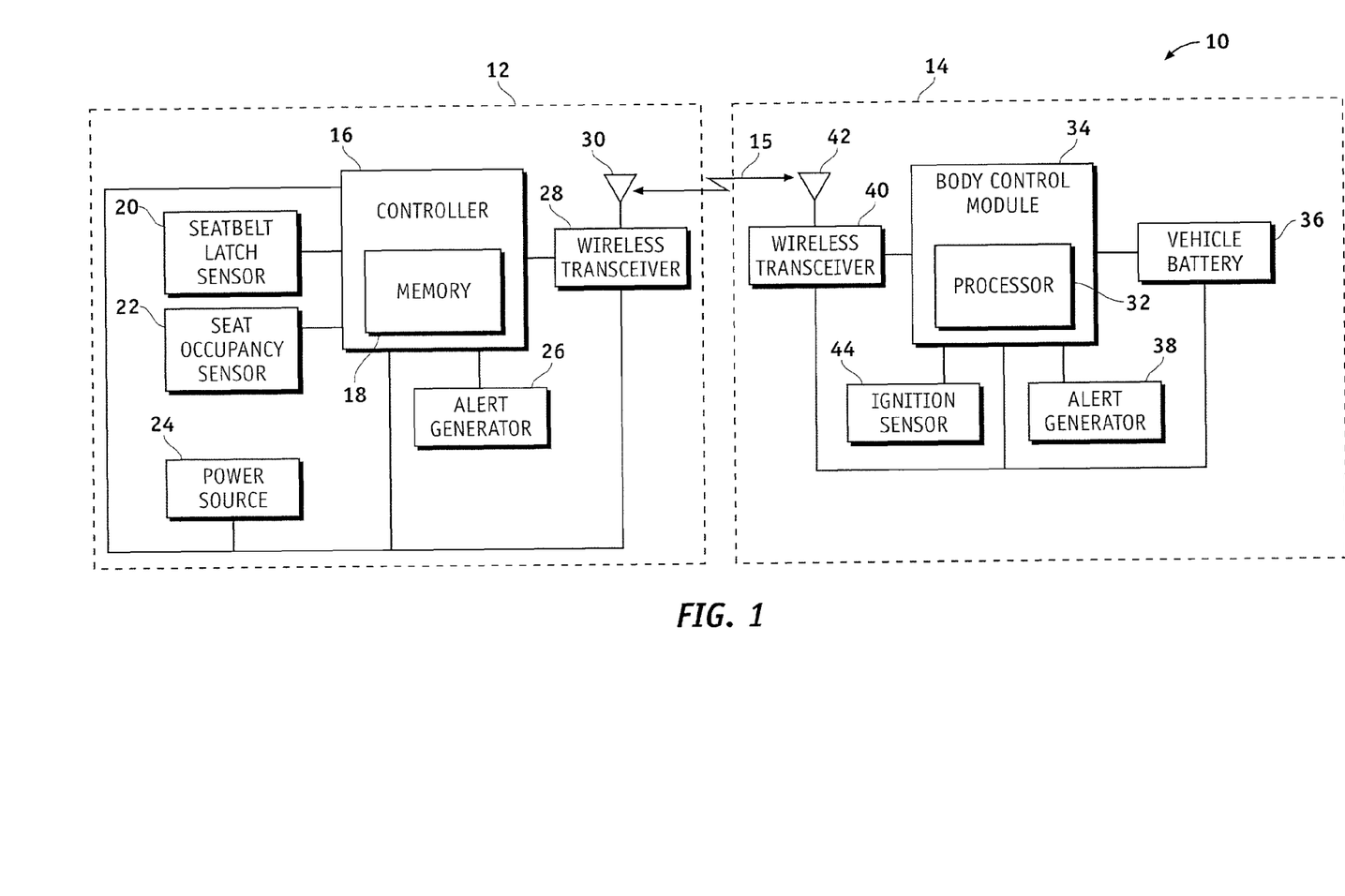
FIG. 1 is a block diagram of a wireless seatbelt monitoring system including a wireless seatbelt status detector and a vehicle seatbelt status indicator in accordance with a first exemplary embodiment.

FIG. 1 is a block diagram of a wireless seatbelt monitoring system 10 in accordance with a first exemplary embodiment. Wireless seatbelt monitoring system 10 comprises a wireless seatbelt status detector 12 and a vehicle seatbelt status indicator 14. As indicated in FIG. 1 at 15, wireless seatbelt status detector 12 communicates with vehicle seatbelt status indicator 14 wirelessly and consequently does not require a physical connection to status indicator 14. Wireless seatbelt status detector 12 is thus well-suited for deployment within a modular vehicle seat assembly, such a removable second or third row bench seat. This notwithstanding, it should be appreciated that wireless seatbelt status detector 12 may be utilized in conjunction with any type of seat assembly and that, in certain embodiments, one or more components of detector 12 may be located exterior to the seat assembly.

In the illustrated exemplary embodiment, wireless seatbelt status detector 12 comprises a controller 16 having a memory 18 associated therewith. Controller 16 may be operatively coupled to a seatbelt latch sensor 20, to a seat occupancy sensor 22, and to a power source 24. In certain embodiments, wireless seatbelt status detector 12 also includes an alert generator 26, which may be, for example, a light emitting diode mounted on the exterior of the seatbelt buckle. To enable wireless bi-directional communication with vehicle seatbelt status indicator 14, seatbelt status detector 12 also includes a wireless transceiver 28, which is coupled to controller 16. Wireless transceiver 28 may be any device capable of sending and receiving wireless signals. For example, wireless transceiver 28 may be radio frequency transceiver having an antenna 30, which is adapted to operate at approximately 315 MHz (US and Japan), 433 MHz (Europe), or any other suitable frequency.

Seatbelt latch sensor 20 may comprise any device suitable for determining the latch status of a seatbelt (i.e., whether the seatbelt latch is currently fastened or unfastened). For example, seatbelt latch sensor 20 may comprise an open circuit (e.g., a microswitch), which is completed when the seatbelt's metal tongue is fully inserted into the seatbelt buckle. Alternatively, seatbelt latch sensor 20 may comprise a mechanical sensing member (e.g., a plunger coupled to a piezoelectric element), which is depressed when the seatbelt's tongue is inserted into the seatbelt buckle. An example of such a mechanical sensing member is described below in conjunction with FIGS. 5 and 6.

Seat occupancy sensor 22 may comprise any device capable of determining if a vehicle seat is occupied. A non-exhaustive list of suitable sensors includes various weight-based, ultrasonic, radiofrequency, and optical devices (e.g., waveguide and camera-type systems). These examples notwithstanding, seat occupancy sensor 22 preferably comprises a known pressure sensitive assembly, which may include a pressure sensor coupled to an inflatable bladder disposed beneath the vehicle seat. In this case, seat occupancy sensor 22 will typically be fully contained within the vehicle seat assembly; however, it should be appreciated that, in other embodiments, one or more components of seat occupancy sensor 22 may be mounted exterior to the vehicle seat assembly.

Power source 24 preferably comprises an energy-storage device, such as a battery. Power source 24 may also include one or more energy-producing devices, such as a coiled antenna in which electrical currents are induced by creating a magnetic field. Power source 24 may include a piezoelectric crystal, which generates a voltage when mechanically stressed. The piezoelectric crystal may be disposed within the seat assembly such that the crystal experiences mechanical stress when a passenger sits on the seat assembly. Alternatively, the piezoelectric crystal may be positioned within the seatbelt buckle and mechanically stressed when the seatbelt's tongue is inserted into the seatbelt buckle. An example of such an arrangement is described below in conjunction with FIGS. 5 and 6.

Referring still to FIG. 1, vehicle seatbelt status indicator 14 includes a processor 32, which may be associated with a conventional on-board system, such as a body control module 34. Processor 32 is coupled to the vehicle's battery 36, to an alert generator 38, and to a wireless transceiver 40 having an antenna 42. If desired, processor 32 may also be coupled to a sensor, which monitors a characteristic indicative of vehicle operation. As indicated in FIG. 1, this sensor may be a vehicle ignition sensor 44, although it should be appreciated that alternative sensors may also be employed; e.g., a PRNDL switch sensor, which detects when the vehicle is placed in DRIVE.

As was the case with transceiver 28, wireless transceiver 40 preferably takes the form of a radio frequency transceiver having an antenna 42 adapted to operate at approximately 315 MHz (US and Japan), 433 MHz (Europe), or any other suitable frequency. To reduce cost and part count, transceiver 28 may comprise a transmitter and/or receiver of the type which is generally installed on motor vehicles and associated with other functions. For example, transceiver 28 may comprise a receiver associated with a remote keyless entry system and/or with a wireless tire pressure monitoring system.

Figure 2:
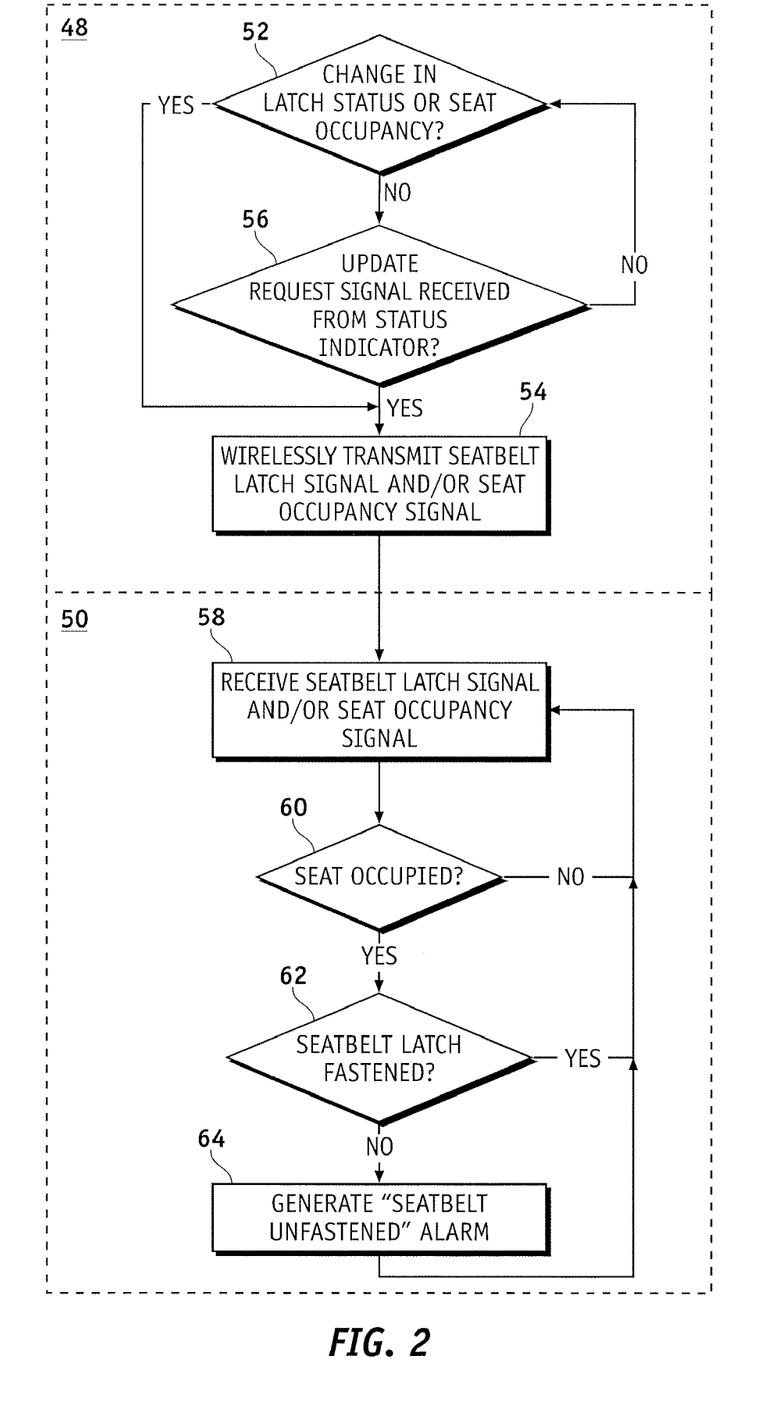
FIG. 2 is a flowchart illustrating a first exemplary seatbelt monitoring process that may be performed by the wireless seatbelt monitoring system shown in FIG. 1.

FIG. 2 is a flowchart illustrating a first exemplary seatbelt monitoring process that may be performed by wireless seatbelt monitoring system 10 (FIG. 1). In particular, the first portion of the process (contained within box 48) may be performed by wireless seatbelt status detector 12, and the second portion of the process (contained within box 50) may be performed by vehicle seatbelt status indicator 14. To begin (STEP 52), controller 16 of wireless seatbelt status detector 12 determines if seatbelt latch sensor 20 or seat occupancy sensor 22 indicates that there has been a change in latch status or seat occupancy, respectively. If there has been such a change in either latch status or seat occupancy, controller 16 advances to STEP 54 described below. Otherwise, controller 16 determines if an update request signal has been received from vehicle seatbelt status indicator 14 (STEP 56). If such an update request signal has not been received, controller 16 returns to STEP 52 and the process repeats. However, if an update request signal has been received from status indicator 14, controller 16 proceeds to STEP 54.

During STEP 54, controller 16 wirelessly transmits a seatbelt latch signal and/or a seat occupancy signal via wireless transceiver 28. Controller 16 may transmit both the latch status signal and the seat occupancy signal when in receipt of an update request from vehicle seatbelt status indicator 14 or when there has been a change in either the latch status or seat occupancy. Alternatively, controller 16 may transmit only the latch status signal, and not the seat occupancy signal, when seatbelt latch sensor 20 indicates that the seatbelt latch has been fastened or unfastened; and only the seat occupancy signal, and not the latch status signal, when seat occupancy sensor indicates that there has been a change in seat occupancy.

After being wirelessly transmitted by controller 16, the seatbelt latch status and/or seat occupancy signals are received by processor 32 of vehicle seatbelt status indicator 14 (STEP 58). Processor 32 utilizes these signals to determine if at least one vehicle seat is currently occupied and if the seatbelt latch associated with the seat is currently fastened (STEPS 60 and 62, respectively). If the seat is unoccupied, or if the seatbelt latch is fastened, processor 32 returns to STEP 58. However, if the seat is occupied and that the seatbelt latch is unfastened, processor 32 generates a "SEATBELT UNFASTENED" alarm via alert generator 38 (STEP 64). This alarm may be audible (e.g., a chime or a voice recording) or visual (e.g., a warning light proximate the vehicle's instrument control panel).

Figure 3:
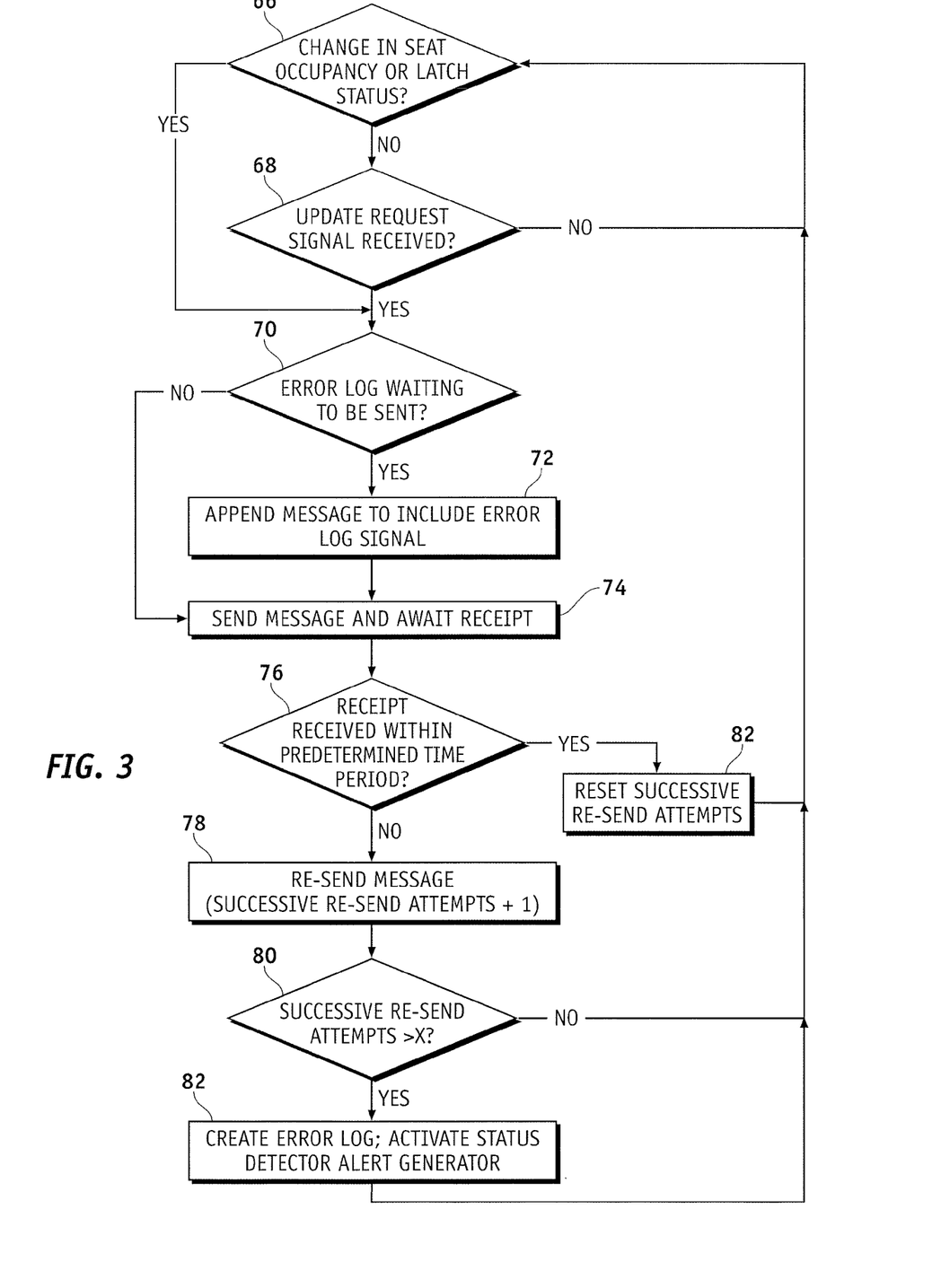
FIG. 3 is a flowchart illustrating a second exemplary process that may be carried out by the wireless seatbelt status detector shown in FIG. 1.
Figure 4:
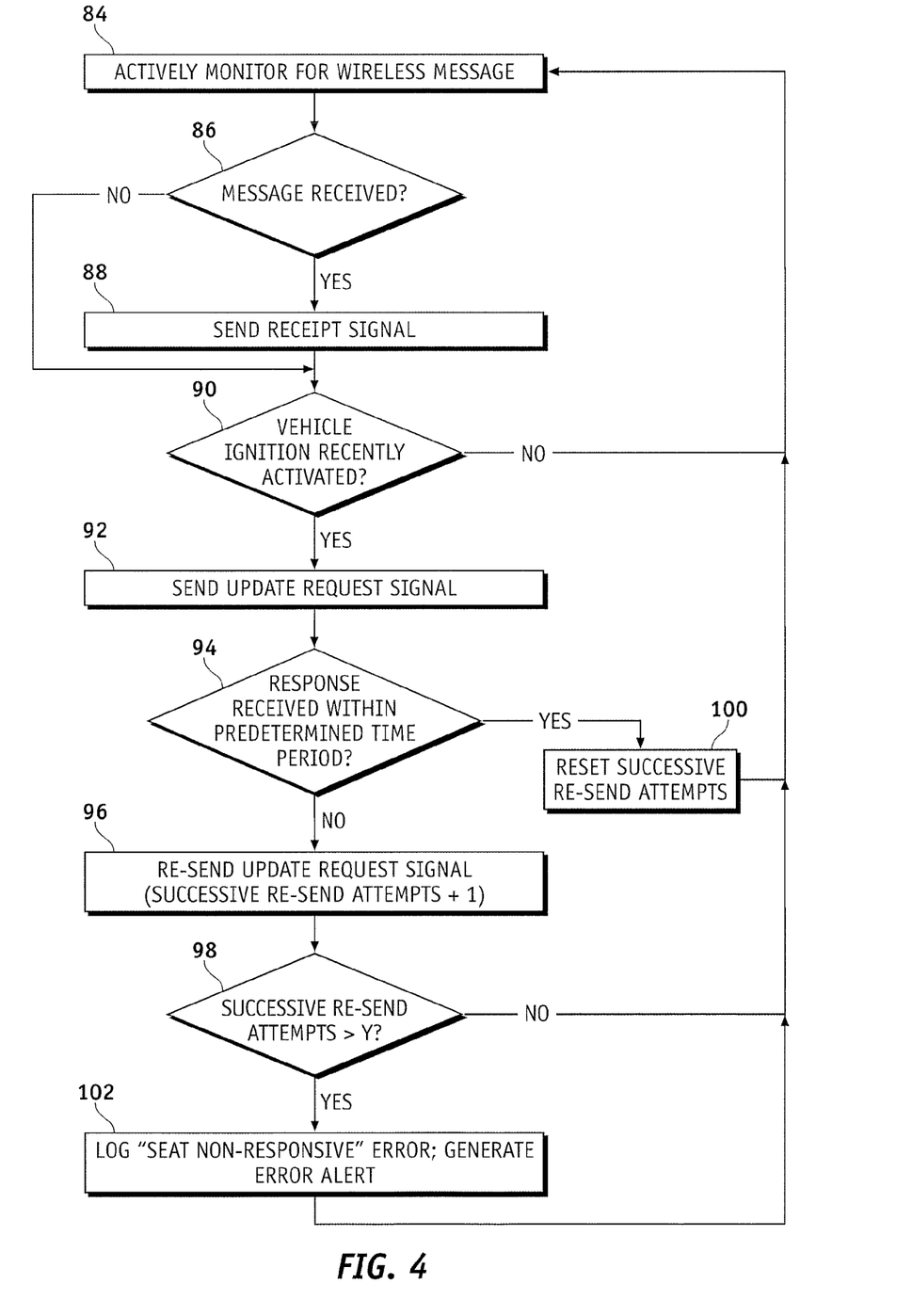
FIG. 4 is a flowchart illustrating a third exemplary process that may be carried out by the vehicle seatbelt status indicator shown in FIG. 1.

As explained above, there may be occasions wherein one or more of the wireless signals emitted by wireless seatbelt status detector 12 are not received by vehicle seatbelt status indicator 14. To address this situation, vehicle seatbelt status indicator 14 may be configured to send a receipt signal after receiving a transmission from wireless seatbelt status detector 12. After sending a wireless signal, wireless seatbelt status detector 12 may wait for such a receipt and, if the receipt is not received within a predetermined period of time, detector 12 may resend the wireless signal. Wireless seatbelt status detector 12 may periodically resend the wireless signal in this manner until it receives a receipt from vehicle seatbelt status indicator 14. FIGS. 3 and 4, described below, provide a more detailed example of such a bi-directional communication process that may be performed by seatbelt monitoring system 10 to ensure that the successful transmission of signals between wireless seatbelt status detector 12 and seatbelt status indicator 14.

FIG. 3 is a flowchart illustrating a second exemplary process that may be carried out by controller 16 of wireless seatbelt status detector 12 (FIG. 1). The first two steps of the process illustrated in FIG. 3 (i.e., STEPS 66 and 68) are similar to the first two steps of the process illustrated in FIG. 2 (i.e., STEPS 52 and 56). During STEP 66, controller 16 determines if there has been a change in seat occupancy or in seatbelt latch status. If there has been such a change, controller 16 proceeds to STEP 70. If there has not been a change in seat occupancy or in latch status, controller 16 determines whether an update request signal has been received from vehicle seatbelt status indicator 14 (STEP 68). If such an update request signal has been received, controller 16 again advances to STEP 70. In an update request signal has not been received, controller 16 returns to STEP 66 and the process is repeated.

During STEP 70, controller 16 determines if an error log is waiting to be sent by, for example, accessing memory 18. If such an error log is waiting to be sent, controller 16 appends the outgoing message, which contains the seatbelt latch status signal and/or the seat occupancy signal, to further include an error log signal (STEP 72). Controller 16 then sends the outgoing message (STEP 74) and awaits a receipt from vehicle seatbelt status indicator 14 (STEP 76). If a receipt is not received within a predetermined time period, controller 16 re-sends the outgoing message (STEP 78) and subsequently proceeds to STEP 80 described below. During this process, controller 16 tracks the successive number of times the outgoing message is re-sent without receiving a receipt from vehicle seatbelt status indicator 14 (i.e., the number of "successive re-send attempts"). For example, controller 16 may add one re-send attempt to the total number of successive re-send attempts for each iteration of STEP 78. However, when a receipt is received within the predetermined time period (STEP 76), the number of successive re-send attempts is reset to zero (STEP 82), and the process is repeated.

During STEP 80, controller 16 determines if the total number of successive re-send attempts exceeds a predetermined threshold value (e.g., ten). If the successive re-send attempts do not exceed the predetermined threshold value, controller 16 returns to STEP 66 and the process repeats. If, however, the total number of successive re-send attempts do exceed the threshold value, controller 16 creates an error log (STEP 82), which may include, for example, an error message (e.g., "RECEIPT NOT RECEIVED") and a corresponding time stamp. Furthermore, if wireless seatbelt status detector 12 is equipped with an alert generator (e.g., alert generator 26 shown in FIG. 1), controller 16 may also generate an audible or visual alert (STEP 82). For example, if alert generator 26 is a light emitting diode mounted on a seatbelt buckle, controller 16 activate alert generator 26 to provide a visual indication that a receipt has not been received from vehicle seatbelt status indicator 14. After this has been done, controller 16 returns to STEP 66 and the exemplary process repeats.

FIG. 4 is a flowchart illustrating a third exemplary process that may be performed by processor 32 of vehicle seatbelt status indicator 14. The process illustrated in FIG. 4 is complementary to, and may be performed concurrently with, the process illustrated in FIG. 3. To commence (STEP 84), processor 32 actively searches for the receipt of a wireless message from wireless seatbelt status detector 12 (see STEP 76 of the process illustrated in FIG. 3). If such a message has been received (STEP 86), processor 32 sends a receipt signal indicating the reception of the wireless message (STEP 88) before advancing to STEP 90. If such a message has not been received (STEP 86), processor 32 skips STEP 88 and advances directly to STEP 90 as described below.

Next, processor 32 queries wireless seatbelt status detector 12 to determine the seatbelt latch status and/or seat occupancy upon the occurrence of a specified event. For example, as indicated in FIG. 4 at STEP 90, processor 32 may determine if ignition sensor 44 indicates that the vehicle's ignition has been recently activated (e.g., within a thirty second time frame). If ignition sensor 44 indicates the vehicle's ignition has not been recently activated, processor 32 returns to STEP 84. If, however, ignition sensor 44 indicates that the vehicle's ignition has been recently activated, processor 32 sends an update request signal to wireless seatbelt status detector 12 (STEP 92) before proceeding to STEP 94.

Referring still to the process illustrated in FIG. 4, STEPS 94-100 are similar to STEPS 76-82 discussed above in conjunction with FIG. 3. During STEP 94, processor 32 waits a predetermined period of time to receive a return signal from wireless seatbelt status detector 12 in response to the update request signal emitted during STEP 92. If such a response signal is not received, processor 32 re-sends the update request signal (STEP 96). Also during STEP 96, processor 32 adds one attempt to the number of successive update request re-send attempts before proceeding to STEP 98 described below. If, however, processor 32 determines that a return has been received from status detector 12, the number of successive update request re-send attempts is reset (STEP 100).

During STEP 98, processor 32 establishes whether the number of successive update request re-send attempts exceeds a predetermined threshold value (e.g., ten). If not, the process is repeated. However, if the total number of successive re-send attempts does exceed the threshold value, processor 32 logs a "SEAT NON-RESPONSIVE ERROR," which may be time stamped and stored in a diagnostic memory associated with body control module 34 (STEP 102). In addition, processor 32 generates an error alert utilizing alert generator 38. As stated above, this error alert may comprise any alarm (e.g., audible, visual, haptic, etc.) that may indicate to a driver that the seat status is unknown and preferably comprises a warning light disposed on the vehicle's instrument control panel. After the performance of STEP 102, processor 32 returns to STEP 84 and the process is repeated.

Figure 5:
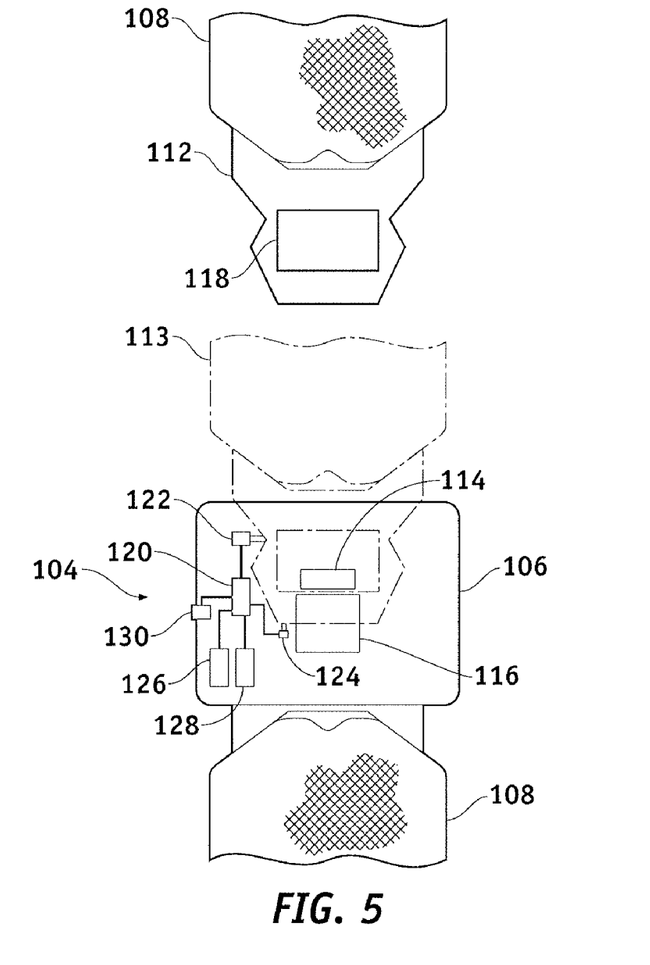
FIG. 5 is a cross-sectional view of a wireless seatbelt status detector deployed within a seatbelt buckle in accordance with another exemplary embodiment.
Figure 6:
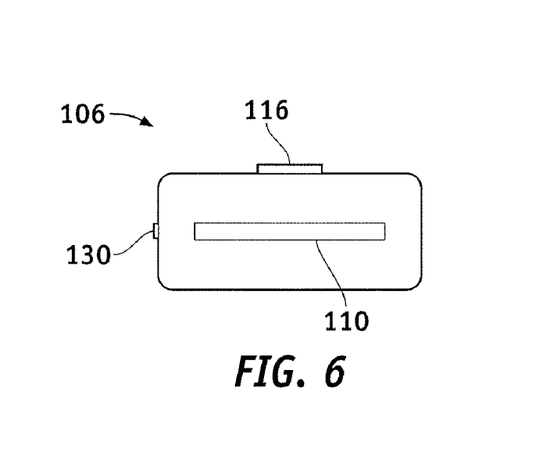
FIG. 6 is a top plan view of the seatbelt buckle shown in FIG. 5.

FIG. 5 is a cross-sectional view of an exemplary wireless seatbelt status detector 104 deployed within a buckle 106 of a seatbelt 108, and FIG. 6 is a top plan view of buckle 106. Buckle 106 includes a longitudinal slot 110 (FIG. 6) therein into which a seatbelt tongue 112 (e.g., metal) may be inserted as indicated in phantom in FIG. 5 at 113. A latch 114, which includes a release button 116, is provided within buckle 106. When tongue 112 is fully inserted into slot 110, latch 114 engages a cut-out 118 provided therethrough to securely fasten the upper and lower portions of seatbelt 108 together. To unfasten the upper and lower portions of seatbelt 108, a user disengages latch 114 by pressing release button 116 and withdraws seatbelt tongue 112 from buckle 106.

In the exemplary embodiment shown in FIGS. 5 and 6, wireless seatbelt status detector 104 includes a controller 120 having a piezoelectric element 122, a microswitch 124, a radiofrequency transceiver 126, and a power source 128 (e.g., a battery) coupled thereto. If desired, wireless seatbelt status detector 104 may also include an alert generator 130, which may be, for example, a light emitting diode (LED) mounted on the exterior of buckle 106. Furthermore, although not shown in FIGS. 5 and 6, wireless seatbelt status detector 104 may also include an occupancy sensor of the type described above.

As was the case with wireless seatbelt status detector 12 (FIG. 1), wireless seatbelt status detector 104 may be configured to emit wireless signals indicative of the latch status of seatbelt 108. Controller 120 may detect when there has been a change in seatbelt status by electrically monitoring piezoelectric element 122, which experiences mechanical stress, and thus generates a voltage, when seatbelt tongue 112 is either inserted into or withdrawn buckle 106. The generated voltage may also be utilized to power wireless seatbelt status detector 104. Controller 120 may further determine whether seatbelt 108 is fastened or unfastened by monitoring microswitch 124, which includes an open circuit that is closed when placed in contact with the conductive tongue of seatbelt 108. Controller 120 may then emit at least one wireless signal indicative of the latch status of seatbelt 108 via radiofrequency transceiver 126. As explained above in conjunction with FIG. 4, controller 120 may then await a receipt signal from the vehicle seatbelt status indicator (e.g., status indicator 14 shown in FIG. 1). If the receipt signal is not received within a predetermined number time period, controller 120 may re-send the wireless signal. Moreover, if the number of successive re-send attempts exceeds a threshold value, controller 120 may activate LED 130 to provide a visual indication that the vehicle seatbelt status indicator is non-responsive.

It should be appreciated that the exemplary seatbelt monitoring processes described above may be utilized to monitor the status of a seat assembly (e.g., a bench seat) having multiple seats and seatbelts. For example, the seatbelt monitoring system may comprise a seatbelt latch sensor and an occupancy sensor for each seat. A separate transceiver and/or processor may be coupled to each pair of seatbelt latch and seat occupancy sensors, and each transceiver may be configured to emit signals in accordance with a unique time table to prevent simultaneous signal broadcasting. This notwithstanding, it is preferable that multiple seatbelt latch and occupancy sensors are coupled to a single processor and transceiver. In this case, the wireless signal emitted by processor 32 may uniquely identify the particular seat that is occupied or unoccupied and/or the particular seatbelt latch that is fastened or unfastened.

It should thus be appreciated that there has been provided a wireless seatbelt monitoring system, which is configured to generate unlatched seatbelt alerts for occupied seats only. It should further be appreciated that there has been provided a wireless seatbelt monitoring system were configured to perform remedial steps if a wireless signal fails to reach the vehicle controller (e.g., resend the wireless signal and, if appropriate, generate an error alert). While at least one exemplary embodiment has been presented in the foregoing detailed description, it should be appreciated that a vast number of variations exist. It should also be understood that the embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A seatbelt monitoring system for use onboard a vehicle having a seat assembly including at least one seat and seatbelt, comprising:
   a wireless seatbelt status detector, comprising:
      a seatbelt latch sensor;
      a first wireless transceiver; and
      a controller coupled to the seatbelt latch sensor and to the first wireless transceiver, the controller configured to send a seatbelt latch signal via the first wireless transceiver when the seatbelt latch sensor indicates a change in latch status; and
   a vehicle seatbelt status indicator, comprising:
      a second wireless transceiver; and
      a processor coupled to the second wireless transceiver, the processor configured to send a receipt signal to the wireless seatbelt status detector after receiving the seatbelt latch signal via the second wireless transceiver;
   wherein the controller is further configured to: (i) re-send the seatbelt latch signal if the receipt signal is not received within a predetermined time period, and (ii) create an error log after a predetermined number of successive re-send attempts.

2. A seatbelt monitoring system according to claim 1 wherein the wireless seatbelt status detector further comprises a seat occupancy sensor coupled to the controller.

3. A seatbelt monitoring system according to claim 2 wherein the controller is further configured to send a seat occupancy signal via the first wireless transceiver when the seat occupancy sensor indicates a change in seat occupancy.

4. A seatbelt monitoring system according to claim 3 wherein the vehicle seatbelt status indicator further comprises an alert generator, and wherein the processor is configured to activate the alert generator when the seatbelt latch and seat occupancy signals indicate that the seatbelt is unlatched and that the seat is occupied, respectively.

5. A seatbelt monitoring system according to claim 4 wherein the wireless seatbelt status detector further comprises an alert generator, and wherein the controller is further configured to activate the alert generator after a predetermined number of successive re-send attempts.

6. A seatbelt monitoring system according to claim 5 wherein the seatbelt includes a seatbelt buckle, and wherein the alert generator of the wireless seatbelt status detector comprises a light emitting diode disposed on the seatbelt buckle.

7. A seatbelt monitoring system according to claim 1 wherein the processor is further configured to send an update request signal to the wireless seatbelt status detector.

8. A seatbelt monitoring system according to claim 7 wherein vehicle seatbelt status indicator further comprises an ignition sensor, and wherein the processor is configured to send the update request signal when the ignition sensor indicates that the vehicle's ignition has been activated.

9. A seatbelt monitoring system according to claim 7 wherein the processor is further configured to re-send the update request signal if a response signal is not received from the wireless seatbelt status detector within a predetermined time period.

10. A seatbelt monitoring system according to claim 9 wherein vehicle seatbelt status indicator further comprises an alert generator, and wherein the processor is further configured to activate the alert generator after a predetermined number of successive re-send attempts.

11. A seatbelt monitoring system for use onboard a vehicle having a seat assembly including at least one seat and seatbelt having a latch, comprising:
    a wireless seatbelt status detector, comprising:
        an alert generator;
        a seatbelt latch sensor configured to monitor latch status;
        a seat occupancy sensor configured to monitor seat occupancy;
        a first wireless transceiver; and
        a controller coupled to the alert generator, to the seatbelt latch sensor, to the seat occupancy sensor, and the to the first wireless transceiver, the controller configured to send a wireless message indicative of seatbelt latch status and of seat occupancy; and
    a vehicle seatbelt status indicator, comprising:
        a second wireless transceiver;
        an alert generator; and
        a processor coupled to the second wireless transceiver and to the alert generator, the processor configured to activate the alert generator when the wireless message indicates that the seat is occupied and that the seatbelt latch is unfastened;
    wherein the controller is further configured to: (i) re-send the seatbelt latch signal if the receipt signal is not received within a predetermined time period, and (ii) activate the alert generator after a predetermined number of successive re-send attempts.

12. A seatbelt monitoring system according to claim 11 wherein the processor is further configured to send a receipt signal after receiving the wireless message.

13. A method according for wirelessly monitoring the status of a seatbelt associated with a seat in a vehicle, comprising:
    sending at least one wireless signal indicative of seatbelt latch status and of seat occupancy;
    receiving the wireless signal;
    generating an alert if the wireless signal indicates that the seatbelt latch is unfastened and that the seat is occupied;
    sending a receipt signal indicating that the wireless signal has been received;
    re-sending the wireless signal if the receipt is not received within a predetermined time period;
    monitoring the number of successive re-send attempts; and
    creating an error log if the number of successive re-send attempts exceeds a threshold value.

14. A method according to claim 13 further comprising generating an alert if the number of successive re-send attempts exceeds the threshold value.

* * * * *